United States Patent [19]

Ikedo et al.

[11] Patent Number: 4,754,448
[45] Date of Patent: Jun. 28, 1988

[54] DISK PLAYER HAVING A CLAMPER ALIGNED WITH A TURNTABLE

[75] Inventors: Yuji Ikedo; Tsutomu Miyakawa; Takahiro Okajima; Tsuneo Shimura, all of Saitama, Japan

[73] Assignee: Pioneer Electronic Corporation, Tokyo, Japan

[21] Appl. No.: 888,619

[22] Filed: Jul. 23, 1986

[30] Foreign Application Priority Data

Jul. 23, 1985 [JP] Japan .................................. 60-163409

[51] Int. Cl.⁴ .......................... G11B 3/62; G11B 25/04
[52] U.S. Cl. ..................................................... 369/270
[58] Field of Search ...................... 369/270, 271, 75.2, 369/77.1; 360/99

[56] References Cited

U.S. PATENT DOCUMENTS

| | | | |
|---|---|---|---|
| 4,347,599 | 8/1982 | Vitale | 369/270 |
| 4,455,637 | 6/1984 | Suzuki et al. | 369/270 |
| 4,637,010 | 1/1987 | Okita | 369/270 |

*Primary Examiner*—Steven L. Stephan
*Attorney, Agent, or Firm*—Sughrue, Mion, Zinn, Macpeak & Seas

[57] ABSTRACT

A disk player in which a clamping member clamps a disk against a turntable. The clamping member has two annular bosses and the turntable has one annular boss located between those of the clamping member. A projection of the clamping member has a projection that fits within a slightly larger recess in the turntable. A ball bearing in the projection moves towards the turntable and forces radially outwardly three ball bearings which then contact the side walls of the recess.

8 Claims, 3 Drawing Sheets

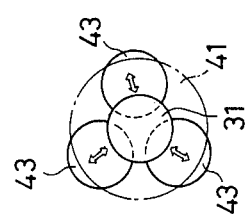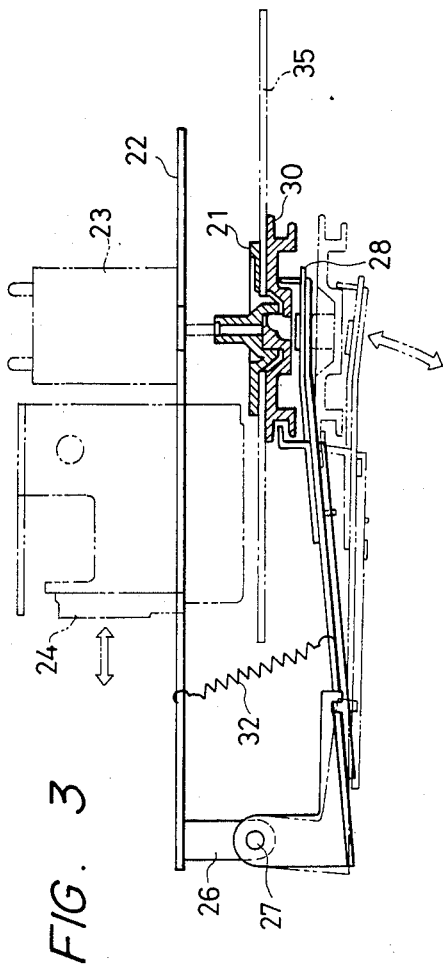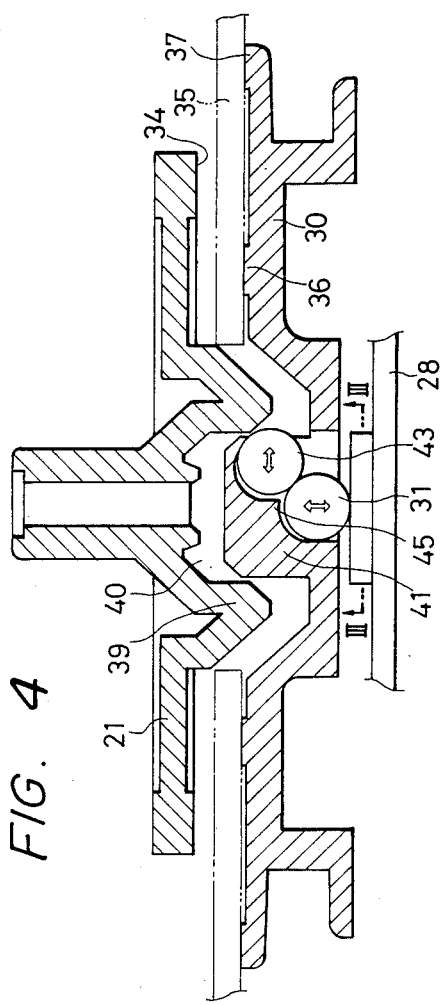

DISK PLAYER HAVING A CLAMPER ALIGNED WITH A TURNTABLE

BACKGROUND OF THE INVENTION

This invention relates to a disk player. Several kinds of disks have recently been developed and used, which are very often called digital audio disks (DADs). Compared with conventional audio disks which are used to store analog signals, DADs are capable of storing a greater quantity of data as recorded digital signals but produce less noise at the time of playback.

A disk player for replaying DADs is equipped with a clamp mechanism for firmly clamping the DAD on its turntable because the DAD is rotated at a speed very much higher than that at which the conventional audio disk is turned. FIG. 1 shows the principal portion of a clamp mechanism and a turntable installed in a conventional disk player.

As shown in FIG. 1, an annular boss 2 is formed over the whole outer periphery of a disk-shaped turntable 1, which abuts a recording disk 3 with its annular boss 2. On the other hand, an annular boss 5 is also formed on the outer periphery of a disk-shaped presser member 4 and is used to abut the lower principal surface of the recording disk 3. The presser member 4 is the principal component of a clamp mechanism and clamps the disk is cooperation with the turntable 1. The diameters of both the annular bosses 2 and 5 are almost the same.

The presser member 4 is rotatably supported by a support member 6 through a ball bearing 7, the support member 6 being vertically movable relative to the turntable 1. A guide 8 fitted into the center hole of the disk 3 for use in positioning the disk 3 on the turntable 1. The guide 8 protrudes around the center of rotation of the turntable 1. A recess 9 perpendicular to the central axis of rotation of the turntable 1 and circular in cross section is formed in the guide 8. A columnar projection 10 that can fit into the recess 9 is formed at the center of rotation of the presser member 4. The recess 9 and the projection 10 constitute a centering means for centering the presser member 4 relative to the turntable 1.

In the disk player thus constructed, a gap e is provided between the recess 9 of the turntable 1 and the projection 10 of the presser member 4, as shown in FIG. 1, to smooth the centering of the presser member 4 about the turntable 1. In the worst case, accordingly, the center axis of the presser member 4 is displaced from the central axis of rotation of the turntable 1 by a distance of e/2, thus causing the bearing member 7 to roll in the form of a circle having a diameter of e relative to the support member 6. Such deflection results in the accelerated degradation of the bearing 7 and causes the turntable 1 to oscillate in the radial direction because of uneven centrifugal force. Also the disk 3 can flex about the circumferential fulcrum between the two bosses 2 and as a result, it is not always possible to provide conditions under which smooth data reading is ensured by means of a pickup.

SUMMARY OF THE INVENTION

In view of the above problem, an object of the present invention is to provide a disk player capable of ensuring the accurate centering of a presser member about a turntable.

According to one aspect of the invention, the disk player is characterized in that the diameter of an annular boss formed on the outer periphery of a diskshaped presser member is greater than the diameter of an annular boss formed on the outer periphery of a turntable.

According to another aspect of the invention, the disk player is also characterized in that it comprises a playback means including the turntable and a clamp mechanism for clamping a disk loaded on the turntable. The clamp mechanism comprises the presser member for clamping the disk in cooperation with the turntable, a support member for rotatably supporting the presser member through a bearing member and a centering means for centering the presser member about the turntable. The bearing member comprises a first moving piece installed at the center of rotation of the presser member and which is movable within a fixed range along the central axis of rotation thereof, the first moving piece smoothly abutting the support member. The centering means comprises a recess, a projection and at least three second moving pieces. The recess is formed in the turntable at its center of rotation, the recess being perpendicular to the central axis of rotation of the turntable and circular in cross section. The projection is formed in the presser member at its center of rotation and is fitted into the recess. The three second moving pieces are movable along a predetermined circle with the central axis of rotation of the presser member as its center point and also in the radial direction of the presser member. The moving pieces abut on the first moving piece and the inner peripheral face of the recess, being pressed against the inner peripheral face of the recess as the first moving piece moves close to the turntable.

BRIEF DESCRIPTION OF THE DRAWINGS

FIG. 3 is a side view showing the principal portion of another disk player embodying the present invention.

FIGS. 4 and 5 are partial detailed views showing the above principal portion.

DESCRIPTION OF THE PREFERRED EMBODIMENT

Referring to the accompanying drawings, the principal portion of a disk player embodying the present invention will be described.

Figure 2:
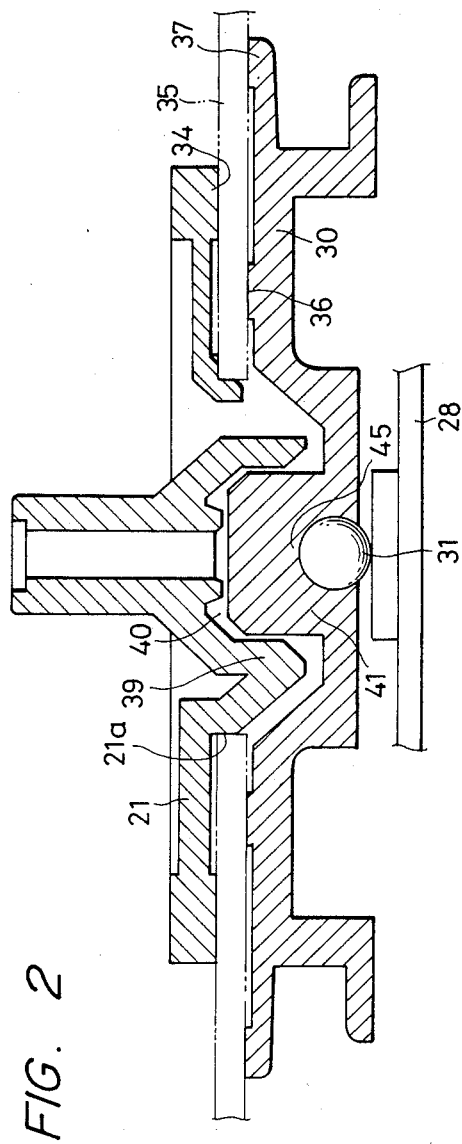
FIG. 2 is a side view showing the principal portion of a disk player embodying the present invention.

FIG. 2 shows an embodiment of the present invention.

As shown in FIG. 2, an annular boss 34 is formed over the whole outer periphery of a turntable 21 and the turntable 21 abuts a recording disk 35 with its annular boss 34. On the other hand, two bosses 36 and 37 are formed on a presser member 30 concentrically with the central axis of rotation of the presser member 30 as the center point. These bosses 36 and 37 are used to abut on the principal surface of the disk 35. The diameter of the annular boss 34 formed on the turntable 21 is made larger than that of the inner annular boss 36 and smaller than that of the outer annular boss 37 formed on the presser member 30.

As is evident from FIG. 2, the turntable is not circularly symmetric. Instead a number of arms 21 connect the central part of the turntable 21 and a wall 39 of the recess 40 with its annular boss 34. A guiding surface 21a of each of the arms 21 plus other means center the disk 35 on the turntable 21.

FIGS. 3 through 6 show another embodiment of the present invention.

As shown in FIG. 3, a disk-shaped turntable 21 is directly driven and rotated by a spindle motor 23 fixed onto a chassis 22. A carriage 24 containing an optical pickup means (not shown) is arranged on the chassis 22 and moves parallel to a plane including the disk supporting surface of the turntable 21. A bracket 26 projects from the under surface of the chassis 22 and a support member 28 is swingably attached to the bracket 26 through a pin 27. The pin 27 extends in parallel to the disk supporting surface of the turn table 21 and accordingly the support member 28 is caused to swing perpendicularly to the disk supporting surface of the turntable 21. As is obvious from FIG. 3, a disk-shaped presser member 30, which is used for clamping a disk 35 in cooperation with the turntable 21, is rotatably fixed to the free end of the support member 28 through a spherical bearing 31. As shown in FIG. 3, a coil spring 32 is installed between the chassis 22 and a point adjacent the free end of the support member 28. The support member 28 is energized by the coil spring 32 in the direction in which the presser member 30 moves closer to the turntable 21. The bearing 31 is movable in the direction of the center of rotation of the presser member 30 within a fixed range along the center axis of rotation of the presser member 30, the bearing member 31 smoothly abutting on the support member 28.

As shown in FIG. 4, a guide 39 is fitted into the center hole of the disk 35 and accurately positions the disk 35 on the turntable 21. This guide 39 projects from the center of the turntable 21. A recess 40 perpendicular to the center axis of rotation of the turntable and circular in cross section is formed in the center of the guide 39. On the other hand, a columnar projection 41 is formed at the center of rotation of the presser member 30 and fits into the recess 40. As shown more specifically in FIG. 5 showing a view taken on line III—III of FIG. 2, three spherical moving pieces 43 are installed in the projection 41 at equal spacing along a predetermined virtual circle centered about the center axis of rotation of the presser member 30. The three moving pieces 43 are movable in the radial direction of the presser member 30. The three moving pieces 43 are also made to abut on the inner peripheral face of the recess 40 and on the upper side of the spherical bearing 31. The three moving pieces are pressed against the inner peripheral face of the recess 40 as the bearing 31 moves close to the turntable 21.

Figure 1:
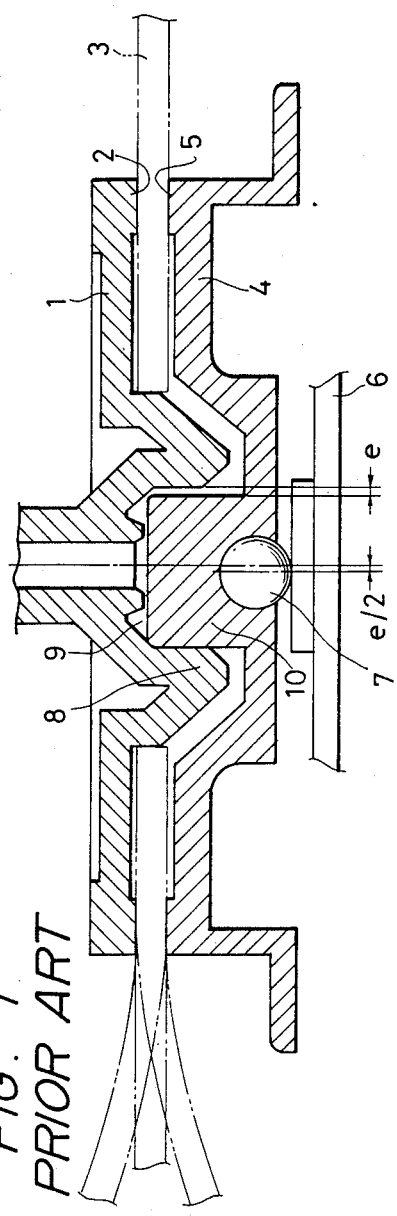
FIG. 1 is a side view showing the principal portion of a conventional disk player.
Figure 6:
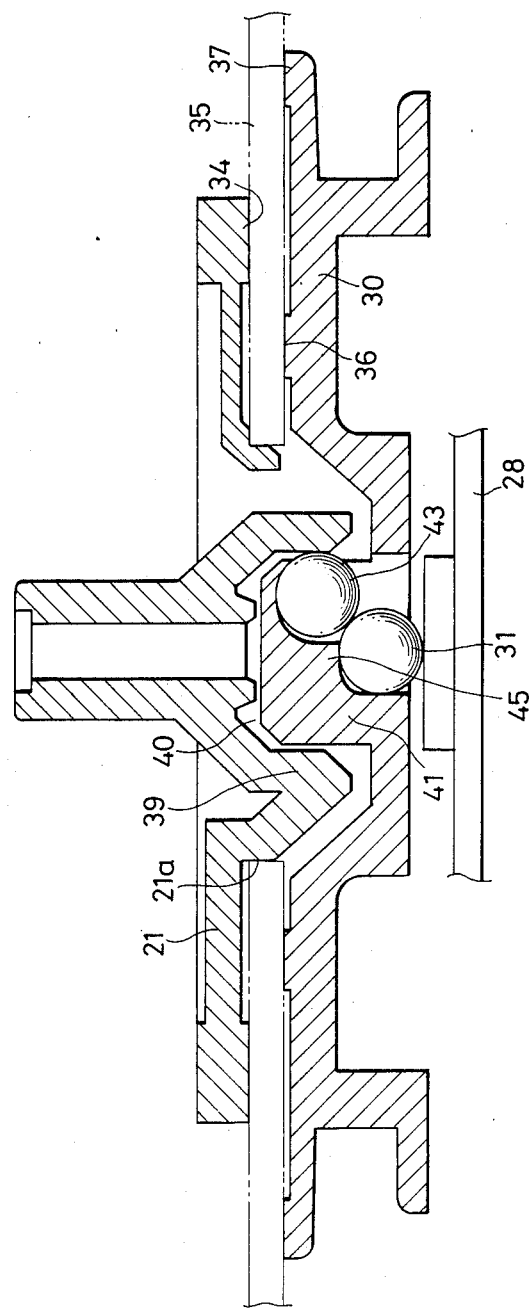
FIG. 6 is a side view explanatory of the operation of the above principal portion.

The above three moving pieces 43 are referred to as second moving pieces, whereas the spherical bearing 31 is referred to as a first moving piece. The second moving pieces, the recess 40 and the projection 41 constitute a centering means for centering the presser member 30 with respect to the turntable 21. FIG. 6 shows the state in which the disk 35 has been clamped and, as shown therein, the three moving pieces 43 are pressed against the inner peripheral face of the recess 40 by the component forces transmitted from the bearing 31 as the first moving piece. The centering of the presser member 30 about the turntable 21 is accurately conducted. When the disk swings as shown in FIG. 1, the annular boss 34 of the turntable 21 works to hold down the maximum of the swing between the two annular bosses 36 and 37 of the presser member 30, so to speak, and the swing is thus attenuated.

Moreover, the projection of the presser member 30 is provided with a control surface 45 for controlling the bearing 31 (the first moving piece) so as to make it move no closer to the turntable 21 than in a predetemined position. The force applied to the second moving piece 43 toward the inner peripheral face of the recess 10 becomes always constant. Since spherical members are used for the first and second moving pieces, spherical bearing members sold on the market become utilizable as those moving pieces and cost reduction is thus realized.

The annular bosses 34, 36 and 37 formed on the faces of the turntable 21 and the presser member 30 respectively abutting the disk 35 may be continuously annular ones or have a configuration wherein parts of the annualar ring are cut out at equal pitches.

As set forth above, because the centering of the presser member about the turntable is accurately carried out in the disk player according to the present invention, it is possible to obtain smooth data reading by means of the pickup.

In consequence of the invention, the centering of the presser member relative to the turntable is accurately effected and the life of the bearing of the presser member is prolonged. As the centrifugal force resulting from the rotation of the presser member is made uniform, moreover, the turntable is prevented from swinging in the radial direction and data reading by means of a pickup can be conducted readily and smoothly.

What is claimed is:

1. A disk player for mounting and rotating an annular recording disk, comprising:
    a drivable, rotatable turntable of disk form mounted for rotation about the axis thereof and having a first annular boss extending from a first principal surface thereof; and
    a clamping mechanism separate from said turntable including a rotatable presser member of disk form, means for mounting said presser member for rotation about its axis generally coaxial with the axis of rotation of said turntable and for movement along its axis of rotation towards and away from said turntable, said presser member having a second and third annular boss on a first principal surface thereof facing said first principal surface of said turntable, said second and third annular bosses being concentric with the rotation axis of said presser member, said annular recording disk being supportable in abutment on either side thereof with said first, second and third annular bosses, the diameter of said first annular boss being larger than the diameter of said second annular boss and being smaller than a diameter of said third annular boss, and said second annular boss being radially inside said first annular boss and radially spaced therefrom, and said third annular boss being radially outside said first annular boss and radially spaced therefrom, said means for mounting said presser member comprises:
    a support member for rotatably supporting said presser member;
    a bearing member disposed between said support member and said presser member;
    wherein said clamping mechanism further comprises centering means for centering said presser member about a rotation axis of said turntable, and wherein said bearing member comprises:

a first moving piece disposed on and movable within a fixed range along said axis of rotation for said presser member and smoothly abutting said support member; and wherein said centering means comprises:

a cylindrical recess formed in said turntable and having an inner wall parallel to said rotation axis of said turntable;

a cylindrical projection extending from said first principal surface of said presser member along said rotation axis of said presser member having a diameter smaller than that of said cylindrical recess and fittable within said recess, and at least three second moving pieces movable along a circular path about said rotation axis of said presser member and movable in radial directions of said presser member, said second moving pieces abutting on said first moving piece and means responsive to movement of said first moving piece axially toward said turntable for causing said second moving pieces to abut said inner wall of said recess.

2. A disk player as recited in claim 1, wherein at least either of said first moving piece or each of said second moving pieces is a spherical member.

3. A disk player as recited in claim 1, further comprising positioning means for positioning said recording disk on said turntable, said positioning means comprising a projection extending from said first principal surface of said turntable and enclosing said recess of said turntable and having on a radially external side guide means fittable within a central aperture of said recording disk.

4. A disk player for mounting and rotating an annular recording disk, comprising:

a driving turntable of disk form rotatable about a first axis; and a clamping mechanism, said clamping mechanism comprising, a presser member of disk form separate from said turntable and rotatable about a second axis for clamping a recording disk to said turntable, a support member for rotatably support said presser member, a bearing member disposed between said support member and said presser member, and centering means for centering said second axis of said presser member with respect to said first axis of said turntable, wherein said bearing member comprises, a first moving piece disposed on, movable within a fixed range along said second axis, and smoothly abutting said support member, wherein said centering means comprises, a circular recess formed in a side of said turntable facing said presser member and having an internal wall parallel with said first axis, an axial projection extending along said second axis from a side of said presser member facing said turntable and fittable within said recess, and at least three second moving pieces movable along a circular path about said second axis and movable radially of said second axis, a movement of said first moving piece axially toward said turntable causing said second moving pieces to abut said first moving pieces and to abut said internal wall of said recess.

5. A disk player as recited in claim 4, further comprising control means for limiting movement of said first moving piece along said axis on a side closer to said turntable.

6. A disk player as recited in claim 4, wherein at least either of said first moving piece or each of said second moving pieces is a spherical member.

7. A disk player as recited in claim 3, wherein at least either of said first moving piece or each of said second moving pieces is a spherical member.

8. A disk player for mounting and rotating an annular recording disk, comprising:

a drivable turntable of disk form rotatable about a first axis;

a clamping mechanism separate from said turntable, said clamping mechanism comprising, a presser member of disk form rotatable independently of said turntable about a second axis for clamping a recording disk to said turntable, a support member for rotatably supporting said presser member, a bearing member disposed between said support member and said presser member, centering means for centering said second axis of said presser member with respect to said first axis of said turntable; and positioning means for positioning said recording disk on said turntable, said positioning means comprising, a central projection of said turntable having guide means projecting along said first axis from the side of said turntable facing said presser member and fittable in a central aperture of said recording disk, and a centrally disposed recess on the side of said turntable facing said passer member extending parallel to said first axis internal to said guide, and moving pieces movably abuttable between said bearing members and said recess.

* * * * *